April 2, 1968
D. J. HARDY ETAL  3,375,895
AIR CUSHION VEHICLES PROVIDED WITH BUOYANT LANDING AND SUPPORTING STRUCTURE
Filed Dec. 23, 1965
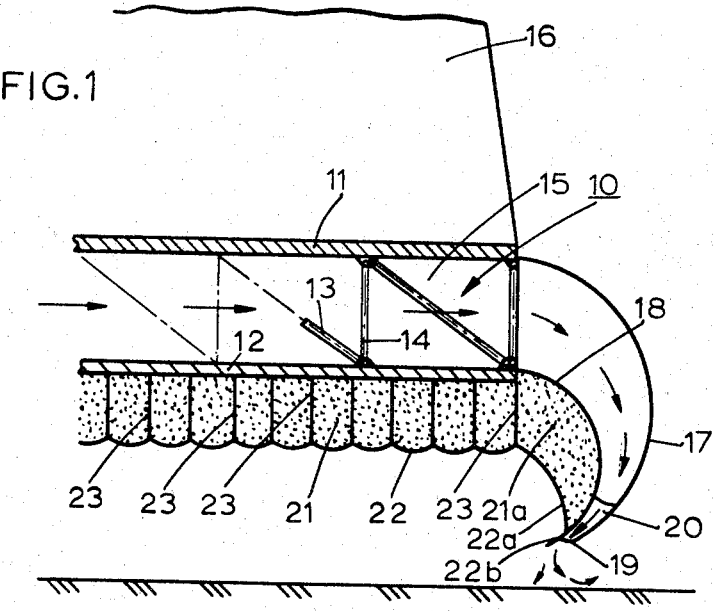
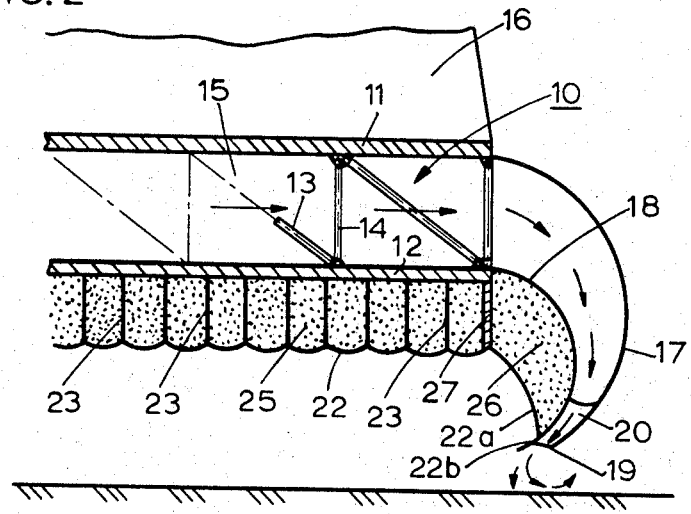

United States Patent Office 3,375,895
Patented Apr. 2, 1968

3,375,895
AIR CUSHION VEHICLES PROVIDED WITH BUOYANT LANDING AND SUPPORTING STRUCTURE
Derek James Hardy, Cowes, Isle of Wight, and Alfred Reginald Pearson, Bonchurch, Ventnor, Isle of Wight, England, assignors to Westland Aircraft Limited, Yeovil, Somerset, England
Filed Dec. 23, 1965, Ser. No. 516,070
Claims priority, application Great Britain, Jan. 9, 1965, 1,073/65
7 Claims. (Cl. 180—128)

ABSTRACT OF THE DISCLOSURE

An air cushion vehicle comprises a rigid base structure, a flexible skirting arrangement defining an air cushion space, and including inner and outer walls and an air inflatable buoyancy chamber. The buoyancy chamber is secured at its margin to the inner skirt walls and at its upper edge to the rigid base structure and extends across substantially the whole of the air cushion space.

---

This invention relates to improvements in air cushion vehicles having a rigid base structure and a flexible skirting arrangement extending therebelow, and it is an object of the invention to provide a vehicle which is amphibious and has an improved lightweight structure which not only affords protection for the bottom of the vehicle if it contacts the ground or water during operation or crash landing in an emergency stop, but also supports and controls to some extent the position of the ducts and obviates undesirable scooping or disturbance of water during operation of the vehicle.

According to the invention an air cushion vehicle having a rigid base structure and a flexible skirting arrangement defining an air cushion space and formed by outer and inner walls disposed around and below the periphery of said structure and served by ducting, associated with said structure, with pressure air to provide peripheral jets, is provided with an air impermeable flexible diaphragm which is secured at its margin to said inner wall and extends across the whole of said air cushion space and forms, with said structure and said inner wall, an inflatable buoyancy chamber and air spring.

The diaphragm may be supported from the lower surface of the structure by a plurality of collapsible tension links.

The air pressure within the buoyancy chamber may be arranged to be maintained in excess of that in the air cushion space. The buoyancy chamber may be arranged to be deflatable during the operation of the vehicle.

If tension links are employed, they may be retractable, to enable the buoyancy chamber to be collapsed and the diaphragm retracted during the operation of the vehicle.

A first portion of the buoyancy chamber located beneath the base structure may be separated by a dividing wall from a second peripheral portion adjoining the inner wall, and the first and second portions may be arranged to be inflatable independently of one another.

The invention will be described with reference to the accompanying drawings, in which:

FIGURE 1 is a fragmentary diagrammatic cross-section of one embodiment of the invention applied to an air cushion vehicle, and FIGURE 2 is a similar view of another embodiment.

Referring to FIGURE 1, in one embodiment of the invention, an air cushion vehicle is provided with a rigid base structure 10 comprising an upper horizontal member 11 forming a floor or deck and a lower horizontal member 12 spaced therefrom by rigid members 13, 14, so as to provide a hollow interior 15 which may be used as part of a duct or to accommodate ducts served by pressure air from a fan (not shown). The cabin 16 and other superstructure of the vehicle is supported by the upper surface 11 of the rigid base structure 10, and below the lower surface of the rigid base structure there are no other rigid parts or assemblies, as will be seen hereinafter.

Attached to the periphery of the upper member 11 of the rigid base structure is a flexible outer skirt 17 and attached to the periphery of the lower member 12 is a flexible inner skirt 18. These skirts 17, 18 are arranged to be served with the pressure air within the hollow interior 15 of the rigid base structure and to terminate in inturned nozzles 19, the general configuration of the skirting arrangement being known. The nozzles 19 are maintained in their general position by diaphragms 20 extending between the inner and outer skirts, but in general the skirting arrangement is flexible, although when the pressure air served to it under normal operation of the vehicle is passing through the flexible skirting arrangement, it maintains a substantially unchanging configuration.

Below the lower member 12 of the rigid structure there is an inflatable buoyancy chamber 21 formed by an air impermeable diaphragm 22 extending substantially horizontally below said lower member 12 and maintained at a substantially constant distance therefrom by tension links 23 secured to the lower member 12 at their top ends and to the diaphragm 22 at their bottom ends at any desired intervals. While the diaphragm 22 is described as substantially horizontal, it is, in fact, when the buoyancy chamber has been inflated, of a quilted configuration, as may be seen from FIGURE 1, owing to local deformation between the tension links 23 due to the internal pressure on the diaphragm 22. The margins 22a of the diaphragm 22 are extending outwardly and downwardly and at their outer edges 22b they are united to the inner skirt 18, just above the nozzle 19, to form an extension 21a of the inflatable buoyancy chamber 21. Inflation of the chamber 21, 21a, will therefore create a resistance to deformation of the flexible skirting arrangement.

The buoyancy chamber 21, 21a may be inflated to any pressure greater than the cushion pressure of the vehicle. The means for inflation are not shown, but may be derived from the pressure air supply duct 15 of the vehicle, or may be independent of said pressure air supply, for example, by "Schrader" valves from an independent source of pressure.

In operation of the vehicle, the diaphragm 22 and inflated buoyancy chamber 21 constituted thereby form an air mat which will mitigate damage or impact caused by the vehicle becoming subjected either to obstacles or unduly large waves or local disturbances of any kind. In this way the bottom of the vehicle is protected to some extent during crash landing. The extension 21a of the inflatable chamber 21 extending beyond the periphery of the rigid base platform 10 and lying against the inner skirt 18 provides an air spring which not only imparts support to the flexible skirting arrangement but which also, around the stern portion of the vehicle when its is operating over water, facilitates a flare out which prevents scooping of the water.

Referring to FIGURE 2, in another embodiment, the general structure may be regarded as exactly the same except that the inflatable buoyancy chamber previously constituted by 21, 21a is divided into two compartments 25, 26, by a vertical flexible air impermeable wall 27 depending from the outer periphery of the lower member 12 of the rigid structure 10, and so dividing the buoyancy chamber into an inner chamber 25 constituting an air mat and extending only under the rigid structure 10, and an outer chamber 26 constituting an air spring extending only against the inner skirt 18 and not extending inwardly beyond the periphery of the rigid structure 10. The provision of such a dividing wall 27 is conveniently accompanied by independent means (not shown) for inflating or deflating the air mat 25 and the air spring 26. Alteration of the pressure within the outer chamber 26 may be employed to alter the shape of the chamber, and thereby to determine the position of the nozzles 19.

In either of these embodiments, it may be desirable to deflate and retract the buoyancy chamber. For this purpose there may conveniently be provided valve means (not shown) operable during operation of the vehicle to deflate or exhaust the buoyancy chamber, whether or not there is a dividing wall defining an air spring and an air mat. In addition the diaphragm 22 may be retracted through the medium of retractable cables or other means forming the tension links. Individual control of the tension links 23 may conveniently be provided, so that some links may be retracted more or less than others so as to provide differences in the shape of the buoyancy chamber and deviations from the horizontal, for example, to provide a convex or concave configuration to the air diaphragm during operation of the vehicle. Such control may be advantageous either when travelling overland or when travelling in rough water, when it is desired to reduce local impact, or when it is desired to enlarge or reduce the volume of the air cushion space.

We claim as our invention:

1. An air cushion vehicle having a rigid base structure and a flexible skirting arrangement defining an air cushion space, said skirting arrangement being formed by outer and inner walls secured to and disposed around and below the periphery of said structure and served by ducting, associated with said structure, through which pressurized air flows to said skirting arrangement, and an air inflatable flexible buoyancy chamber including a marginal edge and an upper edge, said marginal edge being secured to said inner wall and said upper edge being secured to said rigid base structure, said buoyancy chamber extending across substantially the whole of said air cushion space.

2. An air cushion vehicle as claimed in claim 1, wherein said chamber is supported from the lower surface of said structure by a plurality of collapsible tension links.

3. An air cushion vehicle as claimed in claim 2, wherein the tension links are retractable to enable the buoyancy chamber to be collapsed and the chamber retracted during operation of the vehicle.

4. An air cushion vehicle as claimed in claim 1, wherein the air pressure within the buoyancy chamber is arranged to be maintained in excess of that in the air cushion space.

5. An air cushion vehicle as claimed in claim 1, wherein the buoyancy chamber is arranged to be deflatable during operation of the vehicle.

6. An air cushion vehicle as claimed in claim 1, wherein a first portion of the buoyancy chamber located beneath said base structure is separated by a dividing wall from a second peripheral portion adjoining said inner wall, and said first and second portions are arranged to be inflatable independently of one another.

7. An air cushion vehicle in accordance with claim 1 wherein said inner skirt wall depends outwardly of and downwardly from said rigid base structure and wherein a portion of said buoyancy chamber extends beyond the edge of said structure to provide support for said inner skirt wall.

References Cited
UNITED STATES PATENTS

| | | | |
|---|---|---|---|
| 3,182,740 | 5/1965 | Cockerell | 180—7 |
| 3,253,666 | 5/1966 | Kiernan et al. | 180—7 |
| 3,302,738 | 2/1967 | Bingham | 180—7 |

A. HARRY LEVY, *Primary Examiner.*